(12) United States Patent
Anthony

(10) Patent No.: US 7,588,254 B2
(45) Date of Patent: Sep. 15, 2009

(54) SPORTS EQUIPMENT BAG WITH INTEGRAL DRYING RACK

(76) Inventor: Kenneth Anthony, 105 Sherose Island, Box 5, Crowell's, Barrington Passage, Shelburne County, Nova Scotia (CA) B0W 1S0

( * ) Notice: Subject to any disclaimer, the term of this patent is extended or adjusted under 35 U.S.C. 154(b) by 261 days.

(21) Appl. No.: 11/420,555

(22) Filed: May 26, 2006

(65) Prior Publication Data

US 2007/0273115 A1      Nov. 29, 2007

(51) Int. Cl.
*B62B 1/00* (2006.01)
(52) U.S. Cl. ............... 280/47.24; 280/47.34; 280/47.27; 280/35; 280/639; 280/651; 280/652; 280/47.131; 280/47.17; 280/47.2; 280/47.19; 280/47.26; 280/47.28; 280/47.29; 280/79.2; 206/315.1; 211/198; 224/153
(58) Field of Classification Search ............ 280/47.131, 280/47.17, 47.24, 47.2, 47.19, 47.26, 47.27, 280/47.28, 47.29, 79.2, 47.34, 35, 639, 651, 280/652; 206/315.1; 211/198; 224/153
See application file for complete search history.

(56) References Cited

U.S. PATENT DOCUMENTS

| | | | |
|---|---|---|---|
| 2,084,854 A | 6/1937 | McCarthy | |
| 3,194,576 A * | 7/1965 | Kunkle | 280/654 |
| 3,310,180 A | 3/1967 | Neagle | |
| 3,693,996 A * | 9/1972 | Hardy | 280/47.34 |
| 4,009,891 A * | 3/1977 | Jensen | 280/651 |
| 4,169,607 A * | 10/1979 | Reese | 280/47.19 |
| 4,220,346 A * | 9/1980 | Geschwender | 280/47.18 |
| 445,633 A | 2/1981 | Becker | |
| 4,258,826 A * | 3/1981 | Murray | 182/20 |
| 4,297,795 A | 11/1981 | Licari | |
| 4,358,124 A * | 11/1982 | Geschwender | 280/47.18 |
| 4,564,152 A * | 1/1986 | Herriage | 242/422.4 |
| 4,611,645 A * | 9/1986 | Whisnant | 242/129.5 |
| 4,807,766 A | 2/1989 | Compagnucci | |
| 4,887,837 A * | 12/1989 | Bonewicz et al. | 280/654 |
| 4,917,392 A * | 4/1990 | Ambasz | 280/40 |
| 4,989,749 A * | 2/1991 | Choi | 280/47.34 |
| 5,547,205 A * | 8/1996 | do Rosario Sousa de Cabedo | 280/30 |
| 5,797,612 A | 8/1998 | Buccioni | |
| 5,906,277 A * | 5/1999 | Vienneau | 206/315.1 |
| 5,971,424 A * | 10/1999 | Ingalls | 280/654 |
| 6,095,385 A | 8/2000 | Utu et al. | |
| 6,134,806 A | 10/2000 | Dhaemers | |
| 6,196,398 B1 * | 3/2001 | Lowe | 211/96 |
| 6,386,414 B1 | 5/2002 | Kilduff | |
| 6,780,101 B2 | 8/2004 | Buhler et al. | |
| 7,104,412 B2 * | 9/2006 | Yong | 211/206 |
| 7,243,876 B2 * | 7/2007 | Robison | 242/557 |
| 7,278,645 B1 * | 10/2007 | Davis | 280/47.28 |
| 2004/0124598 A1 * | 7/2004 | Williams | 280/47.29 |

* cited by examiner

*Primary Examiner*—Christopher P Ellis
*Assistant Examiner*—Jacob Meyer
(74) *Attorney, Agent, or Firm*—Miltons LLP

(57) ABSTRACT

A garment transportation and the drying device is provided with a transportation frame for carrying a container for garments, and a drying frame, the drying frame being deployable for supporting garments to be dried when the device is used in drying mode. The transportation frame provides support for a container such as a hockey bag and may be mounted on wheels to operate as a dolly. The drying frame includes a series of drying supports, preferably in the form of cantilevered arms extending from a central support post. Items to be dried such as gloves, etc., may be slid over the free ends of the cantilevered arms.

16 Claims, 4 Drawing Sheets

SPORTS EQUIPMENT BAG WITH INTEGRAL DRYING RACK

FIELD OF THE INVENTION

This invention relates to a carrier for athletic equipment. More particularly, it relates to a drying rack to be used in association with a bag of athletic clothing, such as a hockey bag.

BACKGROUND TO THE INVENTION

In many athletic fields, the clothing worn by an athlete will become damp with body perspiration. Examples are hockey sweaters, gloves, pads etc. It is important that these items be dried promptly after use. Failure to dry the clothing promptly will result in the formation of mildew.

Such clothing is usually transported in some sort of bag. It is known to provide an athletic bag, such as a hockey bag, with a mobile support in the form of a dolly having a frame and a pair of wheels: see U.S. Pat. No. 6,095,385 to Utu et al. issued Aug. 1, 2000. It is also known to provide drying supports in association with an athletic bag. In particular, U.S. Pat. No. 5,906,277 to Vienneau, issued May 25, 1999, aspires to provide a collapsible sports storage gear bag having a gear rack containable within the gear bag, and having support means extending there from, to provide a plurality of spaced-apart gear hanging mounting means for drying athletic clothing.

Other examples of athletic garment drying arrangements are depicted in U.S. Pat. Nos. 6,134,806, 6,386,414 and 6,780,101. Canadian Patent 2,259,871 depicts a wall-mounted drying rack that opens outwardly when mounted on a balcony. This reference is provided with "arms" that support the rack in a desired position.

Clothing drying racks or clothes stands generally are known, see U.S. Pat. Nos. 445,633 to Becker, 2,084,854 to McCarthy and U.S. Pat. No. 3,310,180 to Neagle. U.S. Pat. No. 4,807,766 discloses an A-Frame that allows clothes to be hung on both sides. U.S. Pat. No. 4,297,795 discloses a foldable rack which provides a lower hinge for support bars. However, there is still a need for a clothes drying rack that is integrated into a carrier for a container suited to carry clothing, and particularly clothing and athletic equipment. The present invention addresses this need.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to the present invention in one aspect a garment transportation and drying device is provided with a transportation frame for carrying a container for garments on one, first, side of the transportation frame, and a drying frame carried by or along with, and preferably within, the transportation frame for travel, the drying frame being deployable for supporting garments to be dried when the device is used in drying mode on a second side of the transportation frame, opposite to said first side. The transportation frame provides support for a container such as a hockey bag to be positioned thereon, both when the device is in transportation mode and when it is in drying mode.

According to one variant, the transportation frame may be mounted on wheels in a manner similar to a dolly. At the bottom of the transportation frame are fitted horizontally protruding support members for carrying the garment container while it rests alongside the generally vertically extending transportation frame. These horizontally protruding support members generally have an orientation that is largely perpendicular to the plane defined by the generally vertically extending transportation frame.

The drying frame includes a series of drying supports, preferably in the form of cantilevered arms extending from the transportation frame, and preferably from a central support post. Items to be dried, such as gloves, etc., may be slid over the free ends of the cantilevered arms when arms with free ends are employed. Conveniently and preferably, the drying frame which in the preferred form incorporates a central support post, is fitted to the transportation frame by a hinge or hinge means, allowing the post to be swung outwardly along an arc away from the transportation frame when the drying frame is placed in the drying configuration. In being deployed, this post swings outwardly from the transportation frame on the side of the transportation frame opposite to where a garment bag may be carried. This hinge may be positioned and joined with the transportation frame along a line extending approximately between the two wheels. Latch means extending between the drying and transportation frames may be provided to ensure that the drying frame can be detachable fixed to the transportation frame to prevent the drying frame from being deployed at an undesired time.

An upper end portion of the drying frame and/or support post may have a protruding handle portion which permits the user to pull the entire garment transportation and drying device along on its wheels, once the drying frame has been swung into its traveling configuration. The protruding handle portion may be telescopically mounted to the drying frame permitting it to be extended outwardly when the device is being pulled along as a dolly. In drying mode, the protruding handle portion may also be used to support equipment, such as a helmet.

Preferably, the drying frame is substantially positionable against or nests within the transportation frame when the device is in its traveling configuration. Thus where the transportation frame incorporates vertical members defining a plane, the drying frame can be "parked" adjacent to or within that plane. To accommodate the central post variant, the transportation frame may have an upper transverse member with a notch formed therein, the notch being aligned to receive the central drying rack post, permitting the post to lie when "parked" substantially within a common plane defined by the vertical members of the transportation frame. Upon deployment of the drying frame in drying mode, a restraining means, preferably in the form of strapping that serves as a tether, may extend between the transportation frame and the drying frame. This is one example of a deployment limiting means which limits the extent by which the drying frame may be angled outwardly away from the transportation frame. Other means may include a fixed link or a rotational stop anchored to the transportation frame. Such tether strapping or other links may serve as additional supports for the drying of garments.

According to a further variant, a supplemental device support means is carried on either the transportation or drying frame to ensure that the device remains upright when the drying frame is deployed. This may be in the form of one or more, e.g. a pair, of deployable struts carried by the transportation frame or drying rack, mounted so that they may be swung outwardly, away from the drying frame, to contact the ground and thereby ensure that the drying frame, when loaded with garments, does not cause the entire assembly to fall over. The struts may be anchored in position by hinges that allow such struts, when deployed, to be extended outwardly and downwardly to contact the ground. Preferably such hinged strut means are able to rotate into alignment with the transportation frame for storage.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
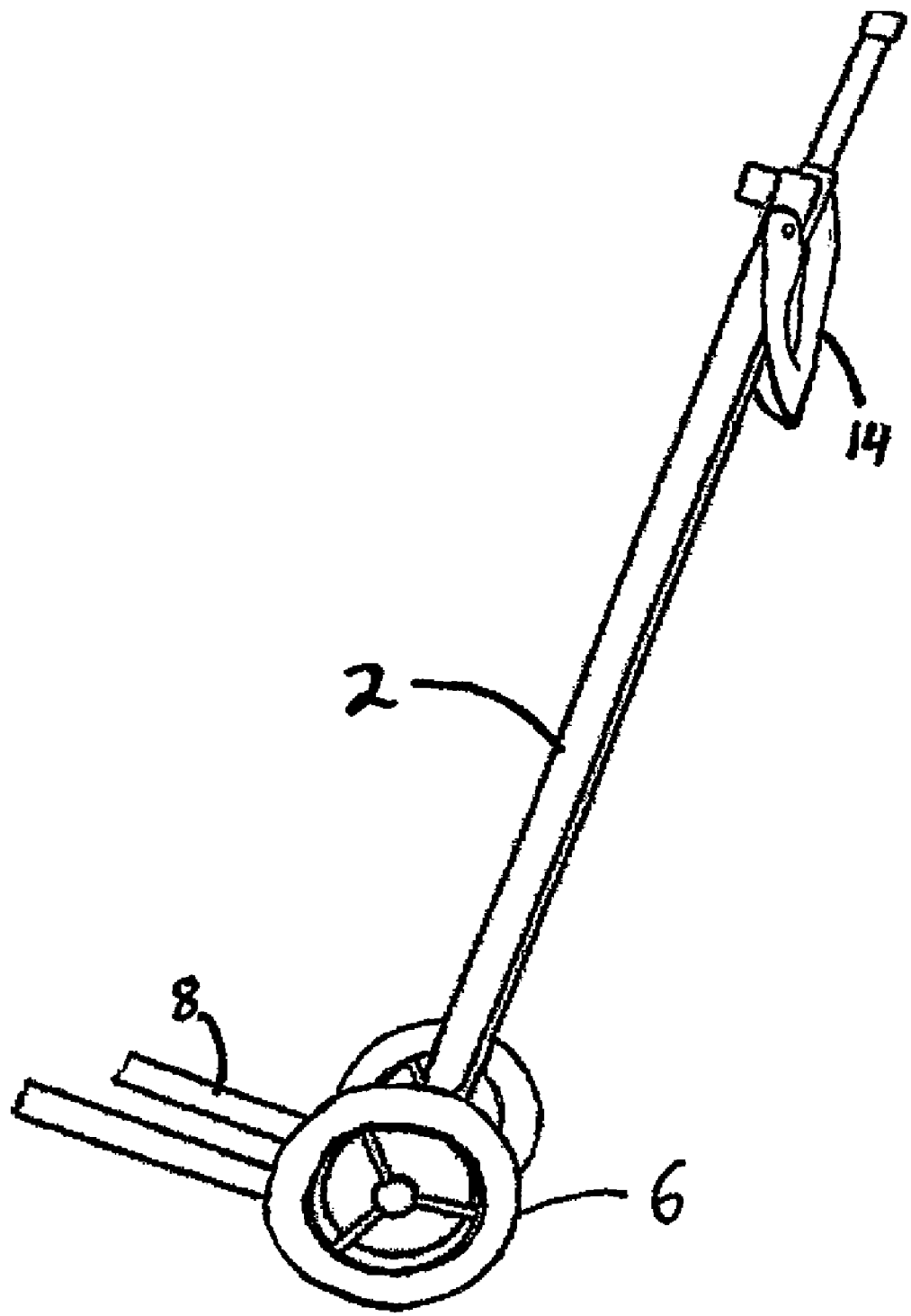
FIG. 1 is a perspective view of the garment transportation and the drying device of the invention positioned in transportation mode without a garment container positioned thereon.
Figure 2:
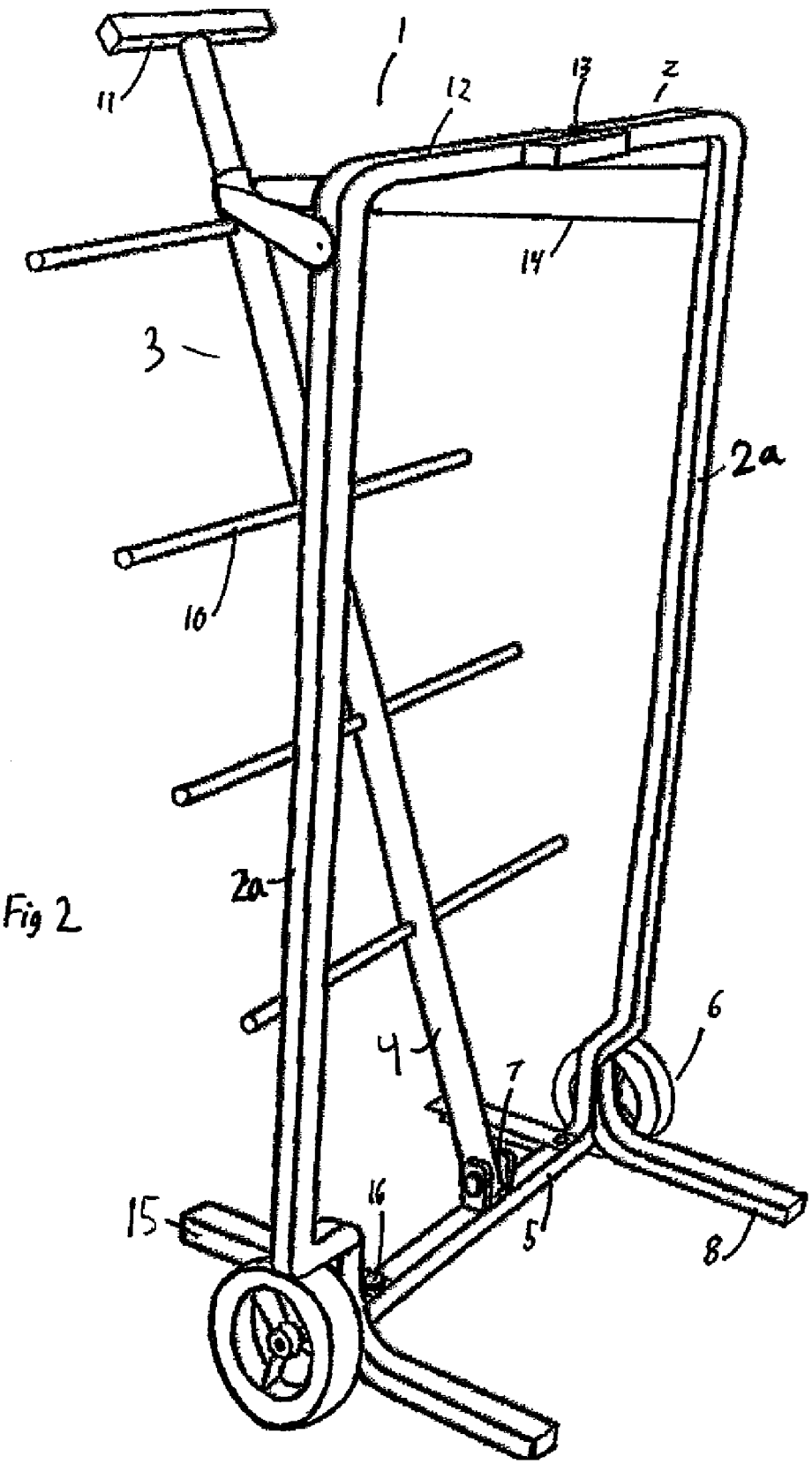
FIG. 2 is a perspective view of the garment transportation and the drying device of the invention positioned in the drying mode without a garment container positioned thereon and with the drying frame and the supports deployed.
Figure 4:
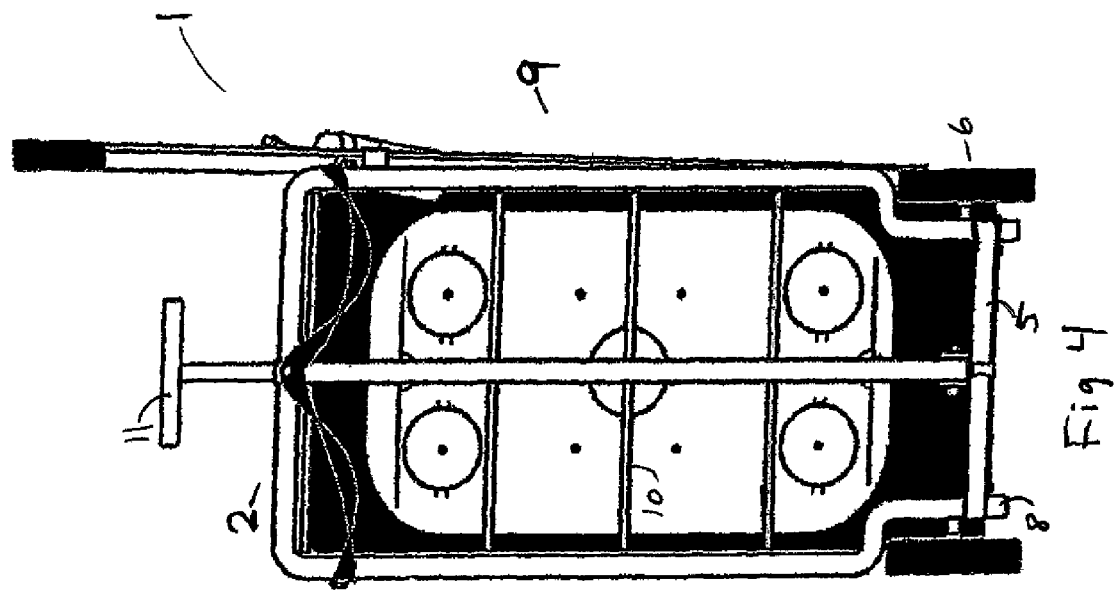
FIG. 4 is a rear view of the garment transportation and the drying device of the invention positioned in transportation mode without a garment container positioned thereon.
Figure 3:
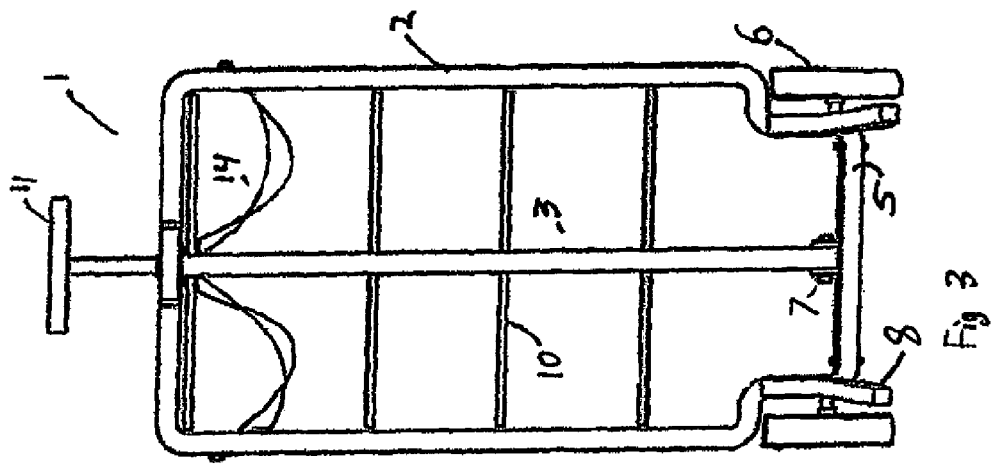
FIG. 3 is a front view of the device of FIG. 1.
Figure 5:
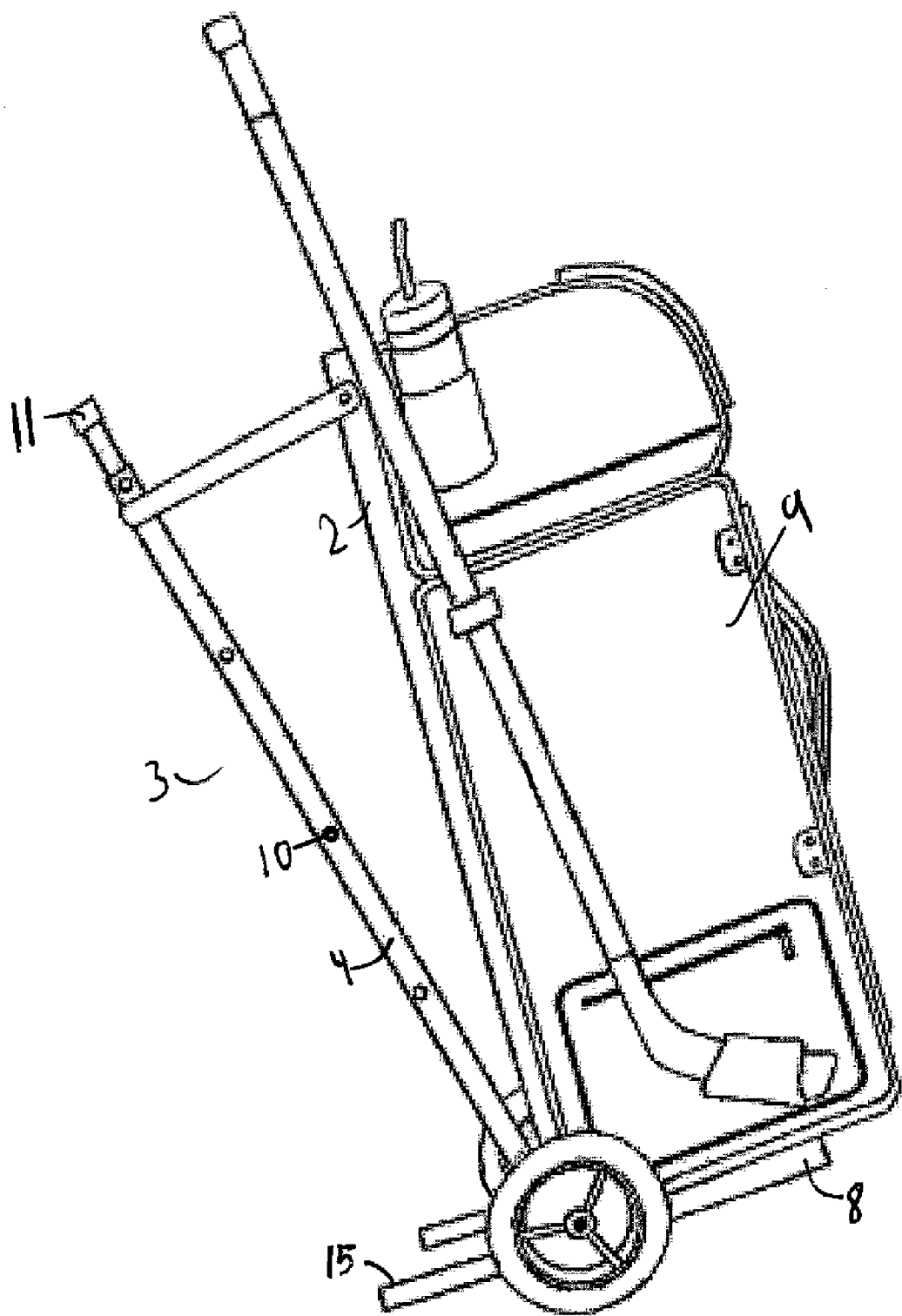
FIG. 5 is a side view of the device of FIG. 2 with a garment bag in place and the drying frame and the supports deployed.

FIG. 1 depicts a garment transportation and the drying device 1 according to the invention having a transportation frame 2 for carrying a container for garments. This transportation frame 2 has two vertical support elements 2A. Within the transportation frame 2 is a drying frame 3 carried by the transportation frame 2. The drying frame 3 has a central post 4 hinged at its lower end to a lower transverse member 5 of the transportation frame 2, at a point which is preferably midway between two wheels 6. Optionally, this post 4 could be hinged from the lower transverse member 5 at a point laterally from a central location. This would serve to permit the use of longer horizontal drying support members 10. The post 4 may also form part of dual support posts (not shown) with posts located on either side of the center of the transportation frame 2. The hinge 7 allows the central post 4 to be swung outwardly along an arc extending from the transportation frame 2 on the side opposite to the side for carrying a container of garments, converting the assembly into the drying configuration.

At the bottom of the transportation frame 2 two horizontally protruding container support members 8 preferably extend at an angle, preferably generally perpendicular, from the plane of the vertically extending transportation frame 2 for carrying the garment container 9

The drying frame 3 includes a series of drying supports 10 in the form of cantilevered arms extending from the central support post 4. Through the use of cantilevered arms 10, gloves and other items that may have a tube-like shape can be more easily mounted on the drying rack of the invention.

An upper end portion of the post 4 has a protruding handle portion 11 which permits the user to pull the entire garment transportation and drying device 1 along on its wheels 6, once the drying frame 3 has been swung into its traveling configuration. The protruding handle portion 11 is telescopically mounted to the drying frame 3 permitting it to be extended outwardly when the device 1 is pulled along as a dolly.

The transportation frame 2 has an upper transverse member 12 with a notch 13 formed therein, the notch 13 being aligned to receive the support post 4, permitting the post 4 to lie when "parked" a generally within a common plane defined by the vertical supports 2A of the transportation frame 2. This allows the drying frame 3 to nest within the transportation frame 2 when the device 1 is in its traveling configuration.

Strapping 14 that is extendable between the transportation frame 2 and the central post 4 and drying frame 3 serves as a tether to limit the extent by which the drying frame 3 may be displaced and angled outwardly away from the transportation frame 2.

A pair of deployable struts 15 are carried by the transportation frame 2 to ensure that the device 1 remains upright even when the drying frame 3 is deployed. These struts 15, fixed in positioned by hinges 16 mounted on the transportation frame 2, may be swung outwardly, past the drying frame 3, to contact the ground and thereby ensure that the transportation frame 2 and drying frame 3 assembly remains in an upright orientation when loaded with garments. The struts 15 are able to rotate into alignment with the transportation frame 2 for storage. While such struts 15 are shown as mounted to the transportation frame as the preferred configuration, they may optionally also be mounted to the drying frame 3.

An advantage of allowing the drying frame 3 to extend outwardly at an angle from the transportation frame 2 when deployed is that, with the drying frame central support 4 angled off the vertical, the garments will tend to hang more nearly vertically, thus improving the flow of drying air between garments.

In this manner, of a mobile carrying support for an athletic bag may also serve to provide a rack for drying of athletic equipment when such equipment has become moistened by the presence of perspiration arising from athletic activity.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

I claim:

1. A garment transportation and drying device capable of being employed either in transportation mode or in drying mode comprising:
   a) a transportation frame having a first side for carrying a container for garments, and
   b) a drying frame for drying garments carried by the transportation frame,
   the drying frame being deployable outwardly from a second side, opposite to said first side, on the transportation frame for supporting garments to be dried when the device is used in drying mode wherein:
   i) said drying frame comprises a central support post positioned between the lateral sides of the transportation frame, the drying frame having a series of drying supports in the form of two or more cantilevered arms that extend from said central support post,
   ii) the central support post is fitted to the transportation frame by a hinge means, allowing the post to be swung outwardly from the transportation frame along an arc thereby extending the drying frame into a drying configuration, iii) the device comprises two wheels mounted on respective lateral sides of the transportation frame wherein the hinge means is positioned and joined to the transportation frame along a line extending approximately between the two wheels, and iv) the central support post comprises an upper end portion having a protruding handle portion which permits the user to pull the entire garment transportation and drying device along on its wheels, once the drying frame has been swung into the configuration for its traveling mode.

2. The device as in claim 1 wherein the transportation frame comprises support means for extending beneath said container when said container is positioned thereon, both when the device is in transportation mode and when it is in drying mode.

3. The device as in claim 1 wherein the drying frame is positionable to nest within the transportation frame when the device is in its transportation mode.

4. The device as in claim 1 comprising wheels mounted on respective lateral sides of the transportation frame to provide that the device may be manually propelled as a dolly.

5. The device as in claim 1 wherein the protruding handle portion is telescopically mounted to the drying frame permitting it to be extended outwardly when the device is pulled along on its wheels.

6. The device as in claim 1 wherein the transportation frame defines a common plane and the device comprises a transverse member with a notch formed therein, the notch being aligned to receive the support post, permitting the post to lie nested therein when "parked" within the common plane defined by the transportation frame.

7. The device as in claim 1 wherein the central support post is fitted to the transportation frame by a hinge means and further comprising a restraining means extending between the transportation frame and drying frame to limit the extension of the drying frame when the drying frame is extended in drying mode and wherein the restraining means is located above the hinge means.

8. The device as in claim 7 wherein the restraining means is in the form of strapping that serves as a tether.

9. The device as in claim 1 comprising a supplemental device support means carried by the transportation frame or drying frame to provide support for the device to remain upright even when the drying frame is deployed in drying mode.

10. The device as in claim 9 wherein the supplemental device support means comprises deployable strut means carried by the transportation frame or drying frame that may be swung outwardly, away from the transportation frame or drying frame to contact the ground and support the transportation frame or drying frame in an upright orientation, when loaded with garments.

11. The device as in claim 10 wherein the strut means is supported by hinges carried by the transportation frame or drying frame that allow such strut means, when deployed, to extend downwardly and contact the ground and permit the strut means to rotate into alignment with the transportation frame for storage.

12. The device as in claim 1 wherein the drying frame, when deployed, is carried substantially by the transportation frame.

13. The device as in claim 1 comprising a restraining means carried by the transportation frame for limiting the deployment of the drying frame, wherein, when the drying frame is deployed outwardly from the transportation frame for supporting garments to be dried when the device is used in drying mode, the restraining means extends between the transportation and drying frame to support the drying frame.

14. The device as in claim 1 comprising a container for garments positioned on the first side of the transportation frame, the drying frame being so located within the transportation frame that upon the deployment of the drying frame outwardly from the transportation frame the container for garments is not disturbed from its position on the transportation frame.

15. The device as in claim 1 comprising a container for garments positioned on the first side of the transportation frame, the drying frame being so located within the transportation frame that upon the deployment of the drying frame outwardly from the transportation frame the container for garments is not disturbed from its position on the transportation frame.

16. The device as in claim 7 comprising a container for garments positioned on the first side of the transportation frame, the drying frame being so located within the transportation frame that upon the deployment of the drying frame outwardly from the transportation frame the container for garments is not disturbed from its position on the transportation frame.

* * * * *